United States Patent
Junkins et al.

(10) Patent No.: US 6,927,757 B2
(45) Date of Patent: Aug. 9, 2005

(54) CAMERA DRIVEN VIRTUAL WORKSPACE MANAGEMENT

(75) Inventors: Stephen Junkins, Bend, OR (US); Jason E. Plumb, Portland, OR (US); Fernando C. M. Martins, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 854 days.

(21) Appl. No.: 09/955,893

(22) Filed: Sep. 18, 2001

(65) Prior Publication Data

US 2003/0052963 A1 Mar. 20, 2003

(51) Int. Cl.$^7$ .............................................. G09G 5/08
(52) U.S. Cl. ...................... 345/158; 348/153; 382/107
(58) Field of Search ................................ 345/7, 8, 156, 345/158; 382/107, 276, 284, 294; 348/153, 154, 700

(56) References Cited

U.S. PATENT DOCUMENTS

| | | | |
|---|---|---|---|
| 5,857,120 A | 1/1999 | Konishi | |
| 5,900,849 A | 5/1999 | Gallery | |
| 6,009,210 A | 12/1999 | Kang | |
| 6,288,704 B1 * | 9/2001 | Flack et al. | 345/158 |
| 6,303,920 B1 | 10/2001 | Wixson | |
| 6,330,356 B1 | 12/2001 | Sundareswaran et al. | |
| 6,333,749 B1 | 12/2001 | Reinhardt et al. | |
| 6,434,265 B1 | 8/2002 | Xiong et al. | |
| 6,597,818 B2 | 7/2003 | Kumar et al. | |
| 6,798,897 B1 | 9/2004 | Rosenberg | |
| 2003/0033150 A1 * | 2/2003 | Balan et al. | 704/275 |
| 2005/0041156 A1 * | 2/2005 | Kondo et al. | 348/700 |

OTHER PUBLICATIONS

Bradski, Gary R., Real Time Face and Object Tracking as a Component of a Perceptual User Interface; 0–8186–8606–5/98; © 1998 IEEE; pp. 214–219.

Darrell, Trevor, et al., Active Face Tracking and Pose Estimation in an Interactive Room; 1063–6919/96; © IEEE, pp. 67–72.

Foxlin, Eric and Harrington, Michael, WearTrack: A Self-Referenced Head and Hand Tracker for Wearable Computers and Portable VR, Wearable Computers, The Fourth International Symposium On, Atlanta, GA, USA Oct. 16–17, 2000, Los Alamitos, CA, USA, IEEE Comput. Soc., Oct. 16, 2000, pp. 155–162, XP10526005A, ISBN: 0–7695–0795–6/00.

Haase, H., et al., Meteorology meets computer graphics—a look at a wide range of weather visualizations for diverse audiences, Computers And Graphics, Pergamon Press Ltd., Oxford, GB, vol. 24, No. 3, Jun. 2000, pp. 391–397, XP4201702A, ISSN: 0097–8493/00, © Elsevier Science Ltd.

(Continued)

*Primary Examiner*—Amare Mengistu
(74) *Attorney, Agent, or Firm*—Blakely, Sokoloff, Taylor & Zafman LLP (57) ABSTRACT

Camera driven virtual workspace management is disclosed. A digital camera captures an input video stream comprising images of a surrounding environment limited by a field of view of the camera. The input video stream is processed by a handheld computer coupled to the camera. Parameters that define a partial view of a virtual workspace are redefined based upon motion analysis of the input video stream performed by the handheld computer during the processing.

24 Claims, 8 Drawing Sheets

OTHER PUBLICATIONS

Klinker, G., et al., Distributed User Tracking Concepts for Augmented Reality Applications, Augmented Reality, 2000, (ISAR 2000) Proceedings, IEEE And ACM International Symposium On Munich, Germany Oct. 5–6, 2000, Piscataway, NJ, USA, IEEE, US, pp. 37–44, XP10520308A, ISBN; 0–7695–0846–4/00.

Qian, Richard J., et al., A Robust Real–Time Face Tracking Algorithm; 0–8186–8821–1/98; © 1998 IEEE pp. 131–135.

Sutherland, Ivan E., A head–mounted three dimensional display, AFIPS Conference Proceedings, vol. 33, Part One, 1968 Fall Joint Computer Conference, Dec. 9–11, 1968, San Francisco, CA, pp. 757–764, The Thompson Book Company, Washington, D.C.

Yang, Ming–Hsuan, et al., Face Recognition Using Kernel Eigenfaces; 0–7803–6297–7/00; © 2000 IEEE, pp. 37–40.

Barron, J.L., et al., Performance of Optical Flow Techniques; 0–8186–2855–3/92; © IEEE; pp. 236–242.

Hamburgen, William R., et al., Itsy: Stretching the Bounds of Mobile Computing; IEEE Computer, Apr. 2001, vol. 34, No. 4, http://computer.org/computer/homepage/april/comppract/cp.1htm; pp. 28–36.

Sawhney, Harpreet, S., et al., Model–Based 2D & 3D Dominant Motion Estimation for Mosaicing and Video Representation; 0–8186–7042–8/95; © 1995 IEEE, pp. 583–590.

* cited by examiner

CAMERA DRIVEN VIRTUAL WORKSPACE MANAGEMENT

FIELD OF THE INVENTION

The invention relates to virtual workspace management in general and to camera driven virtual workspace management in particular.

BACKGROUND

The concept of a "virtual desktop" has met with success in certain usages, such as UNIX workstations. The idea of a virtual desktop is that a user's window manager's desktop is larger than his or her display; i.e., the system typically only shows the user a fraction of the desktop at any given time. To work with other parts of the desktop, the user must use his or her keyboard, or move the mouse to a specified area of the display, such as a corner, to navigate to another part of the desktop. A typical system might have a 1280 by 1024 pixel display but an 8000 by 8000 pixel virtual desktop.

A virtual desktop system can significantly improve spatial organization. Given the extra desktop "real estate," the user can organize windows of particular applications around different tasks and can switch between tasks without closing windows or re-opening others. Rather, the user scrolls the display to the appropriate part of the virtual desktop.

For instance, a user may use one portion of the virtual desktop to organize several webpages. One part of the desktop may contain pages about stock purchases. One page may contain information about each stock. Another page may contain access to an online brokerage account. The user may simultaneously have other web pages open on another portion of the desktop about technical literature that they have been researching. Still another portion of the desktop may contain web pages listing job advertisements that the user has been considering.

Similarly, virtual desktops can be used to organize different applications by task. One portion of the virtual desktop might contain the user's mail and calendaring tools. Another portion of the desktop might contain the user's software development tools such as compilers, debuggers, sample applications, etc. Finally, another portion of the user's desktop might contain art development tools. Again, the user can switch between these different tasks more easily than opening and closing windows.

The importance of virtual desktops in handheld computers is even greater due to their limited screen real estate. Such devices typically have very limited display sizes, i.e., typically approximately 320×240 pixels.

Despite advantages over a conventional windowing system, state-of-the-art virtual desktop systems have drawbacks. First, most systems implemented in handheld computers require the use of two hands for input. For example, the user must hold the handheld computer in one hand and must use the other hand to move a pen stylus across the display. Since handheld computers are often used when carrying items in a "free" hand, input by a stylus or in a similar fashion is problematic. Additionally, systems that have attempted to provide "one-handed" maneuvering, for instance by using an accelerometer to detect movement of the handheld computer, do not provide an intuitive interface with the virtual desktop because movement through the virtual desktop does not necessarily correlate with real-world movements.

DETAILED DESCRIPTION

Camera driven virtual workspace management is disclosed. In the following description, for purposes of explanation, numerous specific details are set forth in order to provide a thorough understanding of the invention. However, it will be apparent to one with ordinary skill in the art that these specific details need not be used to practice the present invention. In other instances, well-known structures and devices are shown in block diagram form in order to avoid unnecessarily obscuring the present invention.

A digital camera captures an input video stream comprising images of a surrounding environment limited by the field of view of the camera. The input video stream is processed by a handheld computer coupled to the camera. Parameters that define a partial view of a virtual workspace are redefined based upon motion analysis of the input video stream performed by the handheld computer during the processing. Such a camera driven virtual workspace management may overcome the "two-handed input" problem and provides a more intuitive control mechanism for workspace navigation. Additionally, it may overcome display size limitations of handheld computers and may do so at a relatively low cost.

Figure 1:
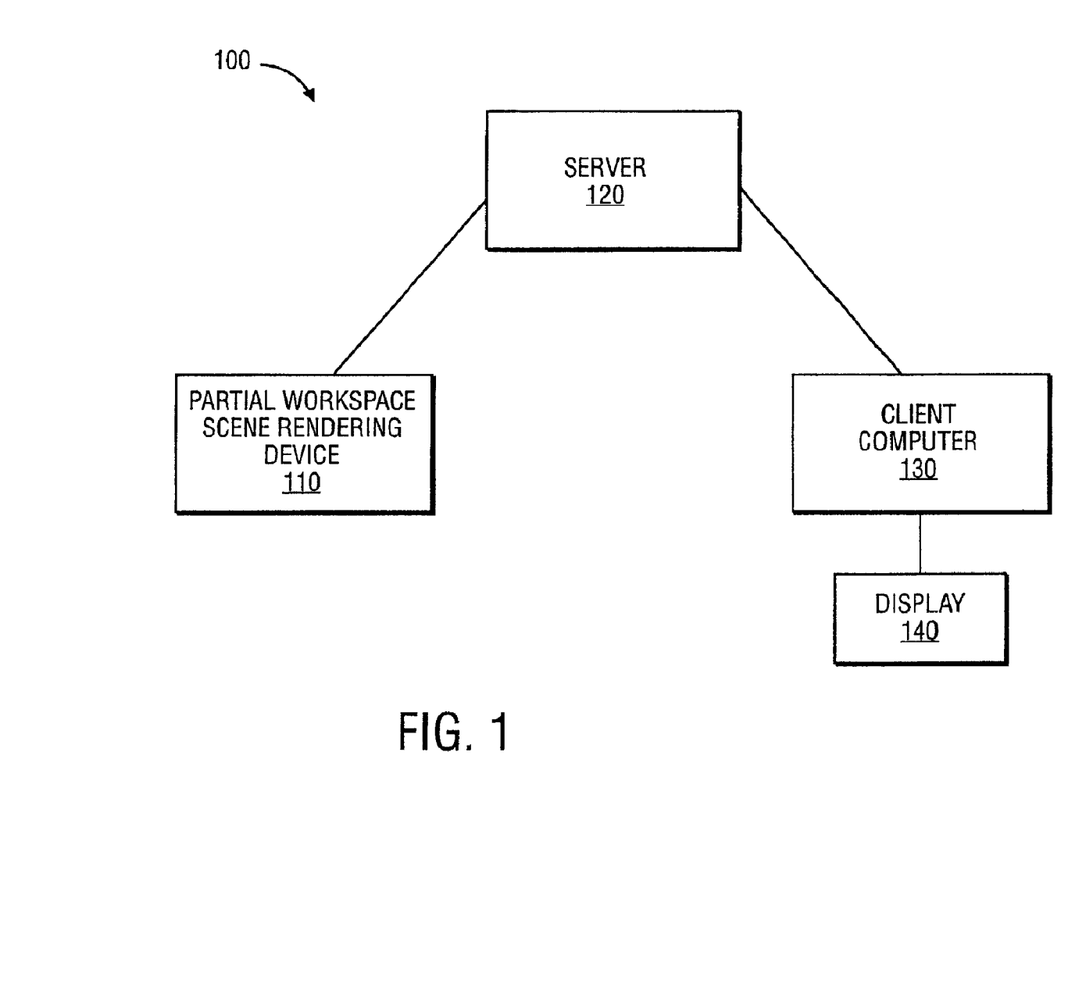
FIG. 1 is a diagram of a system-level overview of an embodiment of the invention.

FIG. 1 is a diagram of a system-level overview of one embodiment of the invention. Partial workspace rendering device 110, in one embodiment, comprises a digital camera for capturing an input video stream, comprising images of a surrounding environment limited by a finite field of view of the digital camera and a handheld computer coupled to the digital camera. The handheld computer receives the input video stream from the digital camera, performs motion analysis on the input video stream, and redefines a partial rendering of the virtual workspace based upon estimated motion information.

Partial workspace scene monitoring device 110 may operate in a stand-alone or network environment, but the invention is not so limited. In one embodiment involving a network, the application is distributed among multiple processors. In another embodiment, the device 110 captures the input video stream. The processing of the input video stream may be performed in the device 110 or on another processor, such as a processor in server 120, which is coupled to device 110 or a client computer 130 coupled to server 120. The virtual workspace may be adjusted and rendered on a remote display, such as a display 140 coupled to client computer 130. Such an application may be used in video conferencing, to show various pages of a workspace to remote viewers, but the invention is not so limited.

Figure 2A:
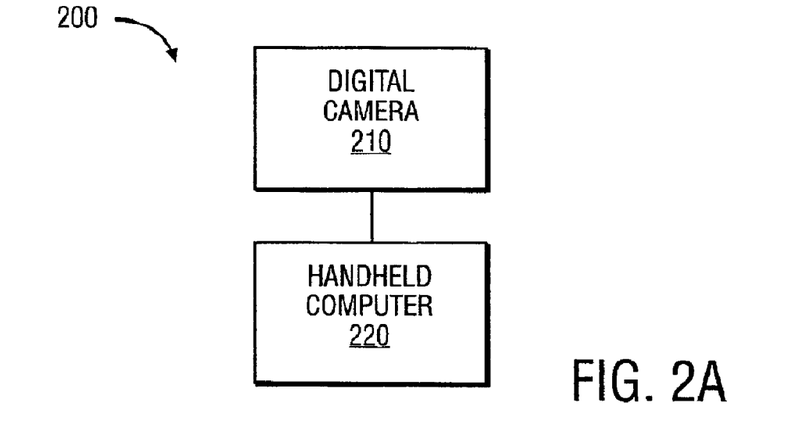
FIG. 2A is a block diagram of one embodiment of a partial workspace view rendering device according to the present invention.
Figure 2B:
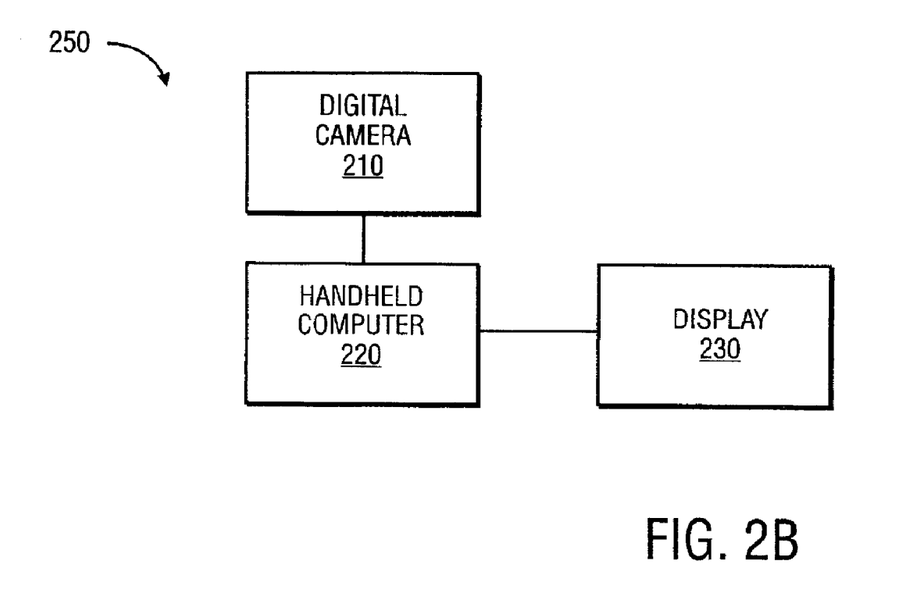
FIG. 2B is a block diagram of another embodiment of a partial workspace view rendering device.

In one embodiment, partial workspace view rendering device 110 may be a device such as device 200 from FIG. 2A, or device 250 from FIG. 2B.

FIG. 2A is a block diagram of one embodiment of a partial workspace rendering device according to the present invention. Digital camera 210 is coupled to handheld computer 220. Digital camera 210 captures an input video stream comprising images of a surrounding environment limited by a field of view of the digital camera 210. Handheld computer 220 receives the input video stream from digital camera 210, performs motion analysis of the input video stream, and redefines a partial view of a virtual workspace based upon the motion analysis of the input video stream.

FIG. 2B is a block diagram of another embodiment of a partial workspace rendering device. Display 230 is coupled to handheld computer 220. Display 230 displays the partial view of the virtual workspace. In one embodiment, display 230 is a component of handheld computer 220.

Figure 2C:
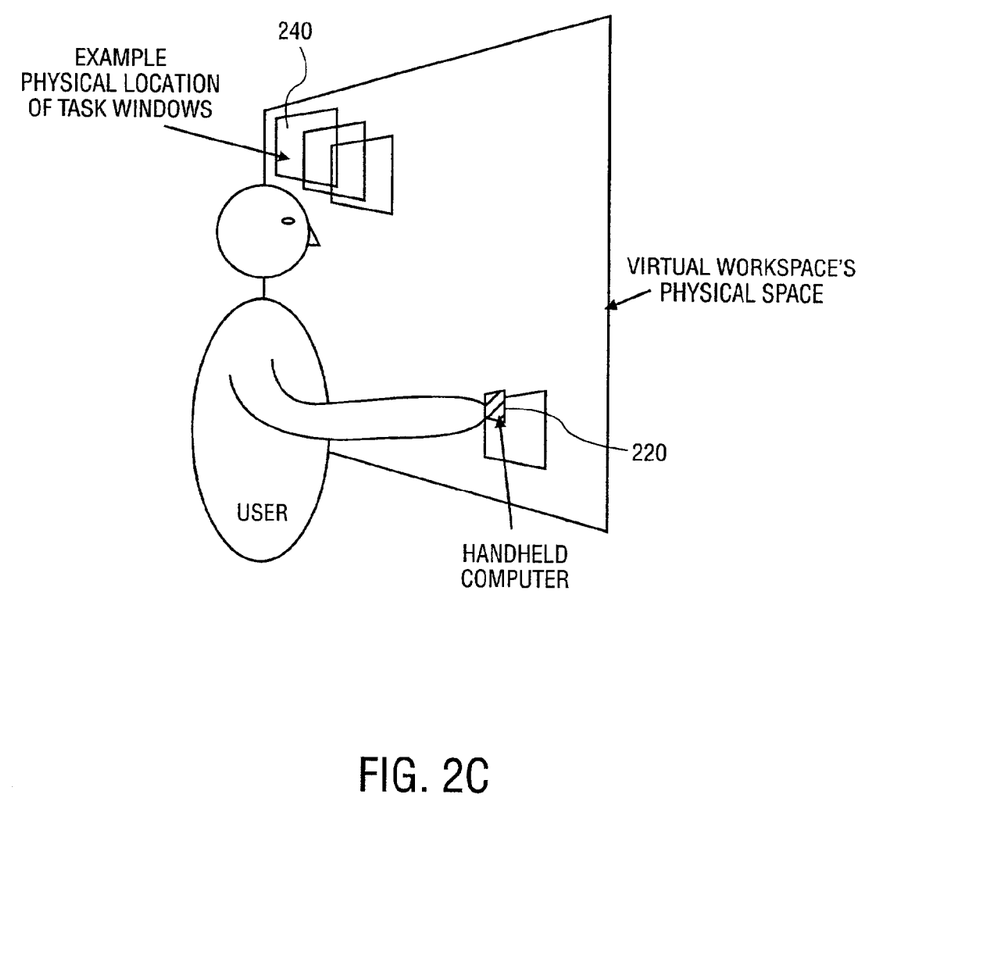
FIG. 2C is a representation of one embodiment of a partial workspace view rendering device, such as the device in FIG. 2B, in operation.

FIG. 2C is a representation of one embodiment of a partial workspace rendering device, such as the device in FIG. 2B, in operation. The user moves handheld computer 220 to areas within a virtual workspace's physical space to select from task windows 240. A task window from task windows 240 can be "pulled down" so that it is displayed on the display of handheld computer 220.

Figure 3:
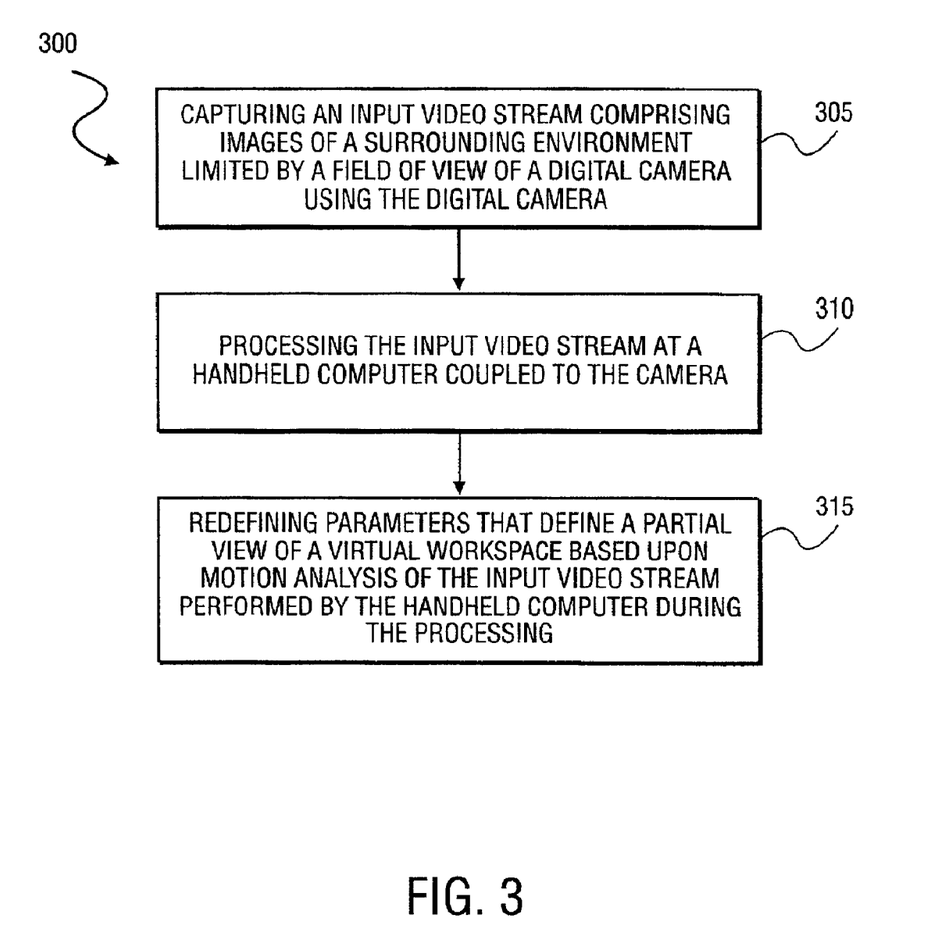
FIG. 3 is a flow diagram of a method to be performed by a computer according to an embodiment of the present invention.

FIG. 3 is a flow diagram of a method to be performed according to an embodiment of the present invention. At block 305, a digital camera captures an input video stream comprising images of a surrounding environment limited by the field of view of the camera. In one embodiment, the images of the surrounding environment comprise video frames that carry information about the surrounding environment. At block 310, the input video stream is received by and processed by a handheld computer coupled to the digital camera. At block 315, parameters that define a partial view of the virtual workspace are redefined based upon a result from motion analysis of the input video stream performed by the handheld computer during the processing. In one embodiment, the motion analysis comprises extraction of motion parameters from the input video stream.

Figure 4:
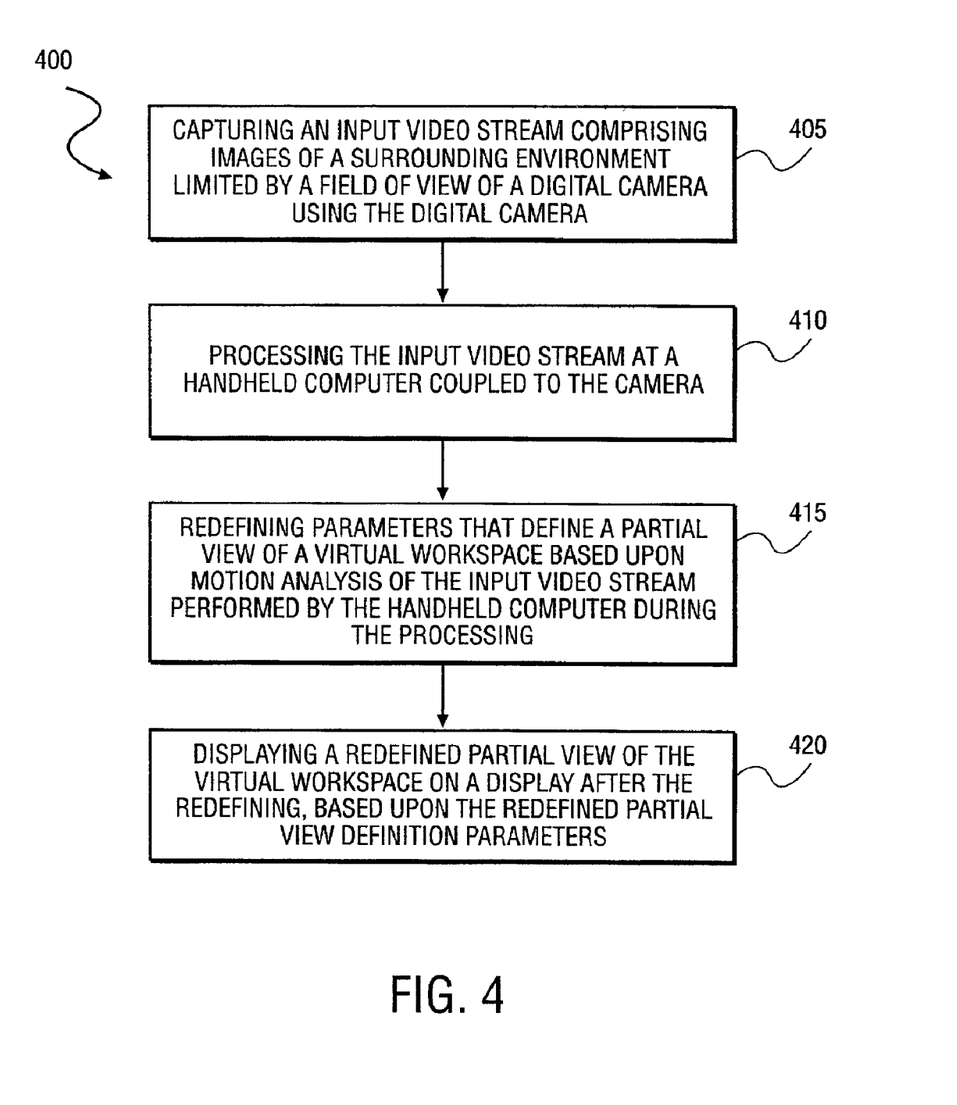
FIG. 4 is a flow diagram of a method to be performed by a computer according to an alternate embodiment of the present invention.

FIG. 4 is a flow diagram of a method to be performed according to an alternate embodiment of the present invention. At block 405, a digital camera captures an input video stream comprising images of the environment limited by the field of view of the camera. At block 410, the input video stream is processed by the handheld computer coupled to the camera. At block 415, parameters that define a partial view of a virtual workspace are redefined based upon a result from motion analysis of the input video stream performed by the handheld computer during the processing. At block 420, a redefined partial view of the virtual workspace is rendered or displayed on an information display after the redefining, based upon the redefined partial view definition parameters.

In another embodiment, the motion is only analyzed in two dimensions. In yet another embodiment, the virtual workspace's physical space, i.e., the physical space in which the user moves the handheld device to navigate a virtual workspace is non-planar. For example, the virtual workspace's physical space may be a spherical dome surrounding the user.

Figure 5A:
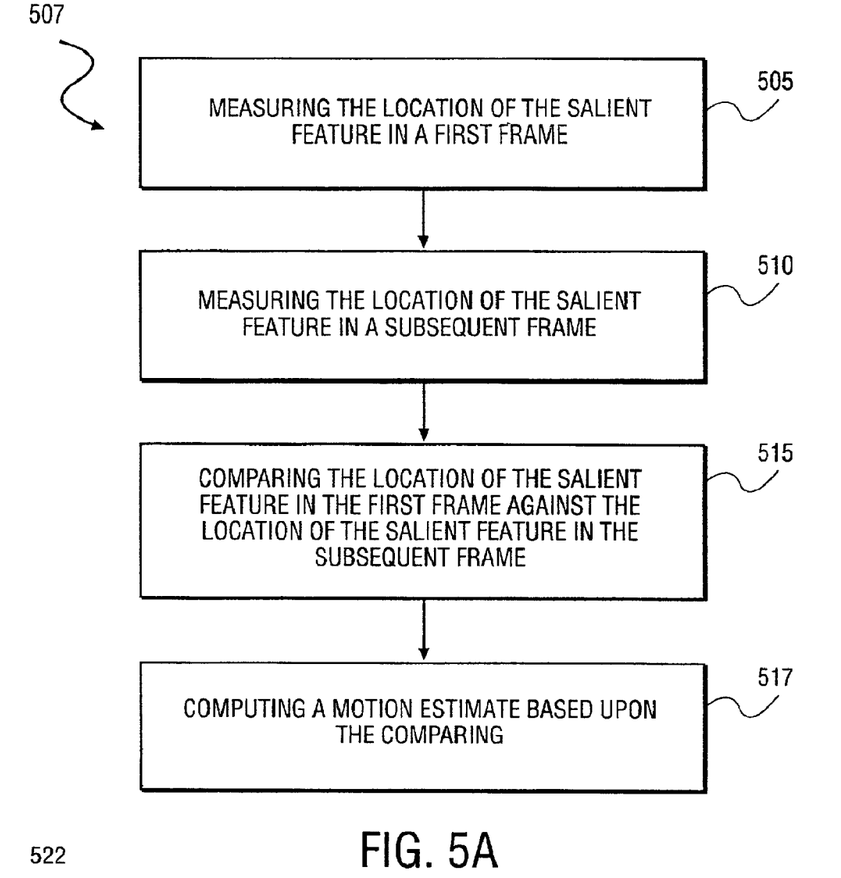
FIGS. 5A–5B are flow diagrams of embodiments of motion analysis methods to be performed according to alternate embodiments of the present invention.
Figure 5B:
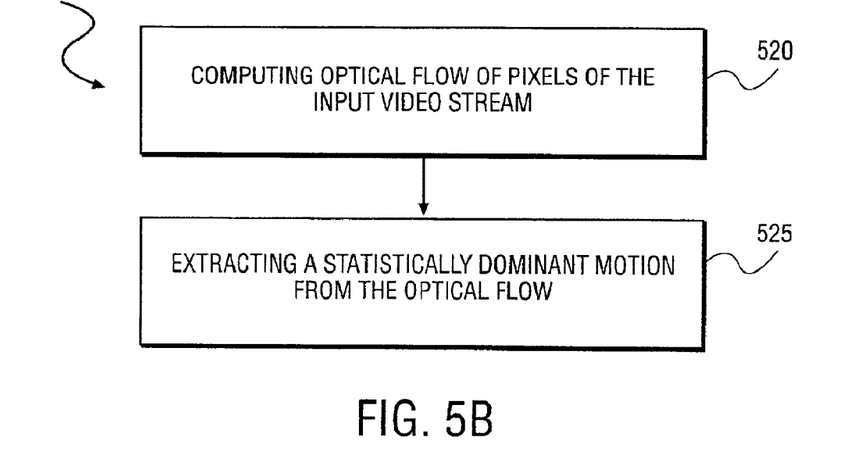

FIGS. 5A–5B are flow diagrams of embodiments of distinct motion analysis methods to be performed according to alternative embodiments of the present invention. In the embodiment of FIG. 5A, the motion analysis is performed by tracking the location of a salient feature or features across the video stream. A salient feature is a conspicuous or prominent feature in the input video stream, such as for example an object or the corner of a room, but the invention is not so limited. At block 505, the location of the salient feature is determined in a first image frame. At block 510, the location of the salient feature is determined for a subsequent image frame. At block 515, the motion of the salient feature is estimated by the evolution of location of the salient feature over time.

FIG. 5B shows another embodiment, where the motion analysis is implemented by computing the principal motion in the input video stream. At block 520, optical flow of pixels of the input video stream is computed. At block 525, a statistically dominant motion is extracted from the optical flow. In one embodiment, the extraction of the statistically dominant motion may comprise caching results of optical flow computations for multiple image frames and performing principal component analysis on the cached results to determine the statistically dominant motion.

Figure 6:
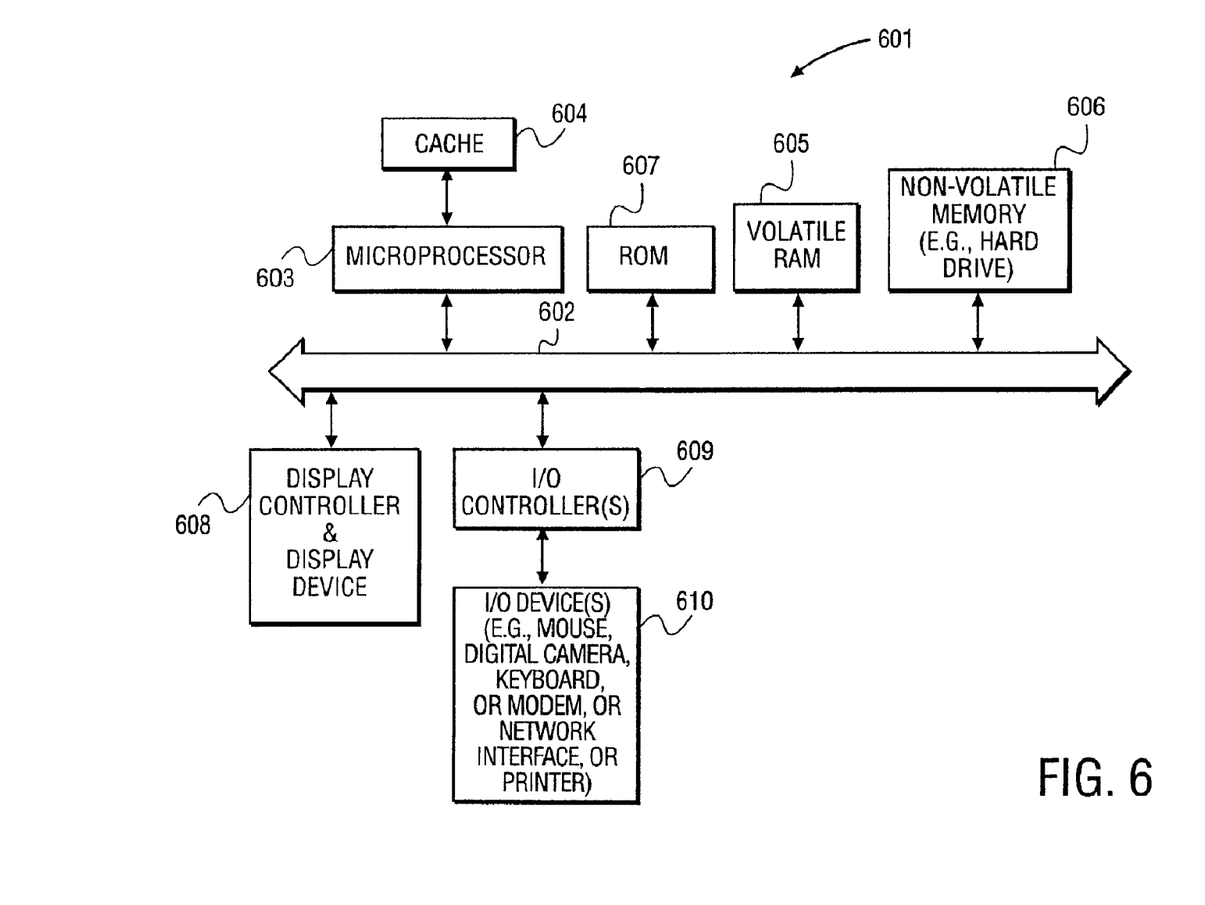
FIG. 6 is a diagram of an operating environment suitable for practicing the present invention.

FIG. 6 shows one example of a typical computer system which may be used with the present invention. Note that while FIG. 6 illustrates various components of a computer system, it is not intended to represent any particular architecture or manner of interconnecting the components, as such details are not germane to the present invention. It will also be appreciated that network computers and other data processing systems which have fewer components or perhaps more components may also be used with the present invention.

As shown in FIG. 6, the computer system 601, which is a form of a data processing system, includes a bus 602 which is coupled to a microprocessor 603 and a ROM 607 and volatile RAM 605 and a non-volatile memory 606. The microprocessor 603 is coupled to cache memory 604 as shown in the example of FIG. 6. The bus 602 interconnects these various components together and also interconnects these components 603, 604, 605, and 606 to a display controller and display device 608 and to peripheral devices such as input/output (I/O) devices which may be digital cameras, mice, keyboards, modems, network interfaces, printers and other devices which are well-known in the art. Typically, the input/output devices 610 are coupled to the system through input/output controllers 609. The volatile RAM 605 is typically implemented as dynamic RAM (DRAM) which requires power continually in order to refresh or maintain the data in the memory. The non-volatile memory 606 is typically a magnetic hard drive or a magnetic optical drive or an optical drive or a DVD RAM or other types of memory systems which maintain data even after power is removed from the system. Typically, the non-volatile memory will also be a random access memory, although this is not required. While FIG. 6 shows that the non-volatile memory 606 is a local device coupled directly to the rest of the components in the data processing system, it will be appreciated that the present invention may utilize a non-volatile memory which is remote from the system, such as a network storage device which is coupled to the data processing system through a network interface such as a modem or Ethernet interface. The bus 602 may include one or more buses connected to each other through various bridges, controllers and/or adapters as is well-known in the art. In one embodiment, the I/O controller 609 includes a USB (Universal Serial Bus) adapter for controlling USB peripherals.

It will be apparent from this description that aspects of the present invention may be embodied, at least in part, in machine-executable instructions, e.g., software. That is, the techniques may be carried out in a computer system or other data processing system in response to its processor, such as a microprocessor, executing sequences of instructions contained in a memory, such as ROM 607, volatile RAM 605, non-volatile memory 606, cache 604, or a remote storage device. In various embodiments, hardwired circuitry may be used in combination with software instructions to implement the present invention. Thus, the techniques are not limited to any specific combination of hardware circuitry and software, nor to any particular source for the instructions executed by the data processing system. In addition, throughout this description, various functions and operations are described as being performed by or caused by software code to simplify description. However, those skilled in the art will recognize what is meant by such expressions is that the functions result from execution of the code by a processor, such as the microprocessor 603.

Figure 7:
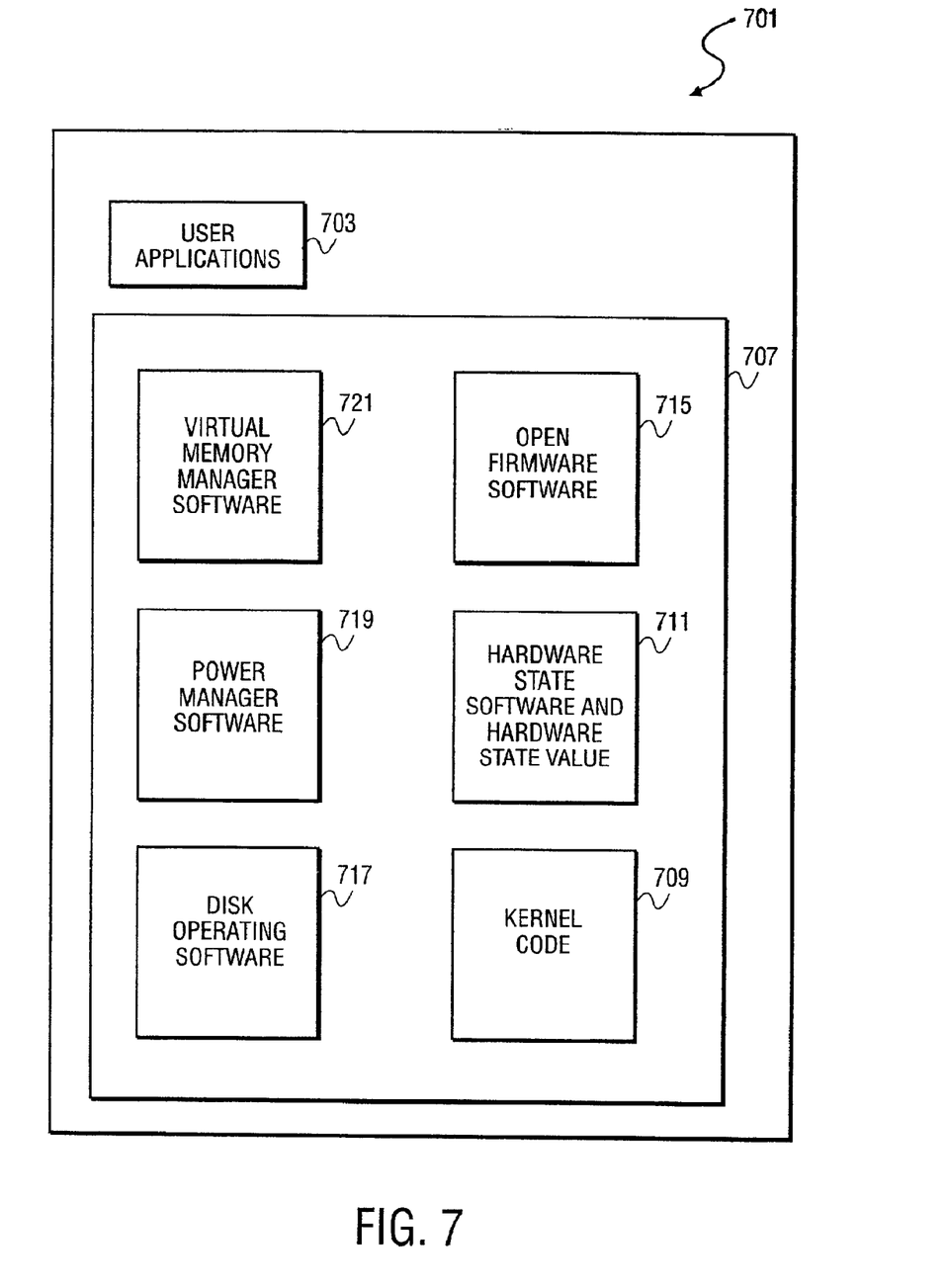
FIG. 7 is a diagram of a computer readable media, which may be used within an operating environment, such as the operating environment of FIG. 6, according to one embodiment of the present invention.

FIG. 7 shows an example of a computer-readable media, which may be used with the data processing system according to one embodiment of the present invention. The computer-readable media contains data and executable software which, when executed in the data processing system such as a digital processing system, cause the system to perform the various methods of the present invention. As noted above, this executable software and data may be stored in various places, including, for example, the ROM 607, the volatile RAM 605, the non-volatile memory 606, and/or the cache 604. Portions of this software and/or data may be stored in any one of these storage devices. The media 701, for example, may be primarily the volatile RAM 605 and the non-volatile memory 606 in one embodiment. The user applications 703 represent software applications which are executing on the computer system, such as a word processing application or a spreadsheet application, an Internet web browser application, or a virtual workspace rendering application. The operating system 707 includes the Open Firmware software 715 which may be stored in the ROM 607 and loaded into RAM 605 at boot up. The hardware state software and hardware state value 711 is the software which generates the hardware state value. The kernel code 709 represents the kernel of the operating system and performs numerous tasks. The virtual memory manager software 721 controls the virtual memory process. This typically involves maintaining a map of page data which represents the state of data in all the virtual memory which includes the physical RAM such as volatile RAM 605 and a portion of the non-volatile memory 606 which has been designated as part of the virtual memory of the system. The virtual memory manager software will be performing conventional virtual memory processes as is known in the art. The power manager software 719 performs the various power-managing operations such as notifying applications and the system and drivers of changes to the power consumption state of the system. The software may also monitor the state of a computer battery to determine whether sufficient power exists to continue to operate, and displays alerts to the user indicating the status of the battery and the power status of the system. The disk operating system software 717 performs the conventional functions of a disk operating system. This typically includes controlling the operation of a hard disk drive which in many examples is the non-volatile memory 606 which serves as a virtual memory for the volatile RAM 605.

It will be further appreciated that the instructions represented by the blocks in FIGS. 3–5B are not required to be performed in the order illustrated, and that all the processing represented by the blocks may not be necessary to practice the invention.

In the foregoing specification, the invention has been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A method in a workspace management system comprising:
    capturing an input video stream comprising images of a surrounding environment limited by a field of view of a digital camera using the digital camera;
    processing the input video stream at a handheld computer coupled to the camera; and
    redefining parameters that define a partial view of a virtual workspace based upon motion analysis of the input video stream performed by the handheld computer during the processing.

2. The method of claim 1, further comprising displaying a redefined partial view of the virtual workspace on a display after the redefining, based upon the redefined partial view definition parameters.

3. The method of claim 1, wherein the display is a component of the handheld computer.

4. The method of claim 1, wherein the motion analysis is planar.

5. The method of claim 1, wherein the motion analysis comprises tracking a location of a salient feature across the input video stream.

6. The method of claim 5, wherein the tracking of the location of the salient feature further comprises:
    measuring the location of the salient feature in a first frame;
    measuring the location of the salient feature in a subsequent frame; and
    comparing the location of the salient feature in the first frame against the location of the salient feature in the subsequent frame; and
    computing a motion estimate based upon the comparing.

7. The method of claim 1, wherein the motion analysis comprises principal motion analysis of the input video stream, the principal motion analysis comprising:
    computing optical flow of pixels of the input video stream; and
    extracting a statistically dominant motion from the optical flow.

8. The method of claim 7, wherein the extracting further comprises:
    caching results of the computing of the optical flow of pixels for multiple image frames of the input video stream; and
    performing principal component analysis of the cached results to determine the statistically dominant motion.

9. An apparatus comprising:
    a digital camera to capture an input video stream comprising images of a surrounding environment limited by a field of view of the digital camera; and
    a handheld computer coupled to the digital camera, the handheld computer to receive the input video stream from the digital camera, to perform motion analysis of the input video stream and to redefine parameters that define a partial view of a virtual workspace based upon the motion analysis of the input video stream.

10. The apparatus of claim 9, further comprising a display that displays the partial view of the virtual workspace.

11. The apparatus of claim 10, wherein the display is a component of the handheld computer.

12. The apparatus of claim 9, wherein the motion analysis comprises tracking a location of a salient feature across the input video stream.

13. The apparatus of claim 9, wherein the motion analysis comprises principal motion analysis of the input video stream, the principal motion analysis comprising:
  computing optical flow of pixels of the input video stream; and
  extracting a statistically dominant motion from the optical flow.

14. A machine-readable medium having stored thereon a plurality of instructions, which if executed by a machine, cause the machine to perform a method comprising:
  capturing an input video stream comprising images of a surrounding environment limited by a field of view of a digital camera using the digital camera;
  processing the input video stream at a handheld computer coupled to the camera; and
  redefining parameters that define a partial view of a virtual workspace based upon motion analysis of the input video stream performed by the handheld computer during the processing.

15. The machine-readable medium of claim 14, wherein the method further comprises displaying a redefined partial view of the virtual workspace on a display after the redefining, based upon the redefined partial view definition parameters.

16. The machine-readable medium of claim 14, wherein the motion analysis comprises tracking a location of a salient feature across the input video stream.

17. The machine-readable medium of claim 15, wherein the motion analysis comprises principal motion analysis of the input video stream, the principal motion analysis comprising:
  computing optical flow of pixels of the input video stream; and
  extracting a statistically dominant motion from the optical flow.

18. A system comprising:
  a processing unit in a handheld computer;
  a memory coupled to the processing unit through a bus; and
  a partial workspace view rendering process executed from the memory by the processing unit to capture an input video stream comprising images of a surrounding environment limited by a field of view of the digital camera using the digital camera, and redefine parameters that define a partial view of a virtual workspace based upon motion analysis of the input video stream performed by the handheld computer.

19. The system of claim 18, wherein the motion analysis comprises tracking a location of a salient feature across the input video stream.

20. The system of claim 18, wherein the motion analysis comprises principal motion analysis of the input video stream, the principal motion analysis comprising:
  computing optical flow of pixels of the input video stream; and
  extracting a statistically dominant motion from the optical flow.

21. A system comprising:
  a partial workspace view rendering device comprising a digital camera to capture an input video stream comprising images of a surrounding environment limited by a field of view of the digital camera and a handheld computer coupled to the digital camera;
  a server communicatively coupled to the partial workspace rendering device; and
  a client computer communicatively coupled to the server, wherein operations of processing the input video stream, performing motion analysis of the input video stream and a redefining parameters that define a partial view of a virtual workspace based upon the motion analysis of the input video stream are distributed between the partial workspace view rendering device, the server, and the client computer.

22. The system of claim 21, wherein a redefined partial view of the virtual workspace is presented on a display coupled to the client computer, based upon the redefined partial view definition parameters.

23. The system of claim 21, wherein the motion analysis comprises tracking a location of a salient feature across the input video stream.

24. The system of claim 21, wherein the motion analysis comprises principal motion analysis of the input video stream, the principal motion pixel flow analysis comprising:
  computing optical flow of pixels of the input video stream; and
  extracting a statistically dominant motion from the optical flow.

* * * * *